(12) United States Patent
Kushal (10) Patent No.: US 12,014,649 B2
(45) Date of Patent: Jun. 18, 2024

(54) BOOK RECOMMENDATION AND FLASHCARD GENERATION

(71) Applicant: Dzmitry Kushal, Mercer Island, WA (US)

(72) Inventor: Dzmitry Kushal, Mercer Island, WA (US)

(*) Notice: Subject to any disclaimer, the term of this patent is extended or adjusted under 35 U.S.C. 154(b) by 0 days.

(21) Appl. No.: 17/880,596

(22) Filed: Aug. 3, 2022

(65) Prior Publication Data

US 2023/0041253 A1 Feb. 9, 2023

Related U.S. Application Data (60) Provisional application No. 63/283,997, filed on Nov. 29, 2021, provisional application No. 63/229,494, filed on Aug. 4, 2021.

(51) Int. Cl.
   *G09B 19/08* (2006.01)
   *G09B 5/02* (2006.01)

(52) U.S. Cl.
   CPC .............. *G09B 19/08* (2013.01); *G09B 5/02* (2013.01)

(58) Field of Classification Search
   CPC .................................. G09B 19/08; G09B 5/02
   See application file for complete search history.

(56) References Cited

U.S. PATENT DOCUMENTS

| | | | |
|---|---|---|---|
| 9,680,945 B1 | 6/2017 | Treves et al. | |
| 10,902,197 B1* | 1/2021 | Lakshmanan | G06F 40/205 |
| 2009/0164897 A1 | 6/2009 | Amer-Yahia et al. | |
| 2010/0159437 A1 | 6/2010 | German et al. | |
| 2012/0179455 A1* | 7/2012 | Cha | G09B 19/06 704/E11.001 |
| 2015/0026825 A1* | 1/2015 | Dube | G06F 16/44 726/28 |
| 2016/0343272 A1* | 11/2016 | Roche | G09B 5/04 |
| 2017/0344530 A1* | 11/2017 | Krasadakis | G09B 19/00 |
| 2018/0165255 A1* | 6/2018 | Gafford | G06V 30/224 |
| 2019/0108773 A1* | 4/2019 | Wyner | G06F 16/951 |
| 2019/0318656 A1* | 10/2019 | Kojima | G06Q 50/20 |
| 2019/0325020 A1 | 10/2019 | Catalano et al. | |
| 2020/0034413 A1* | 1/2020 | Krasadakis | G06F 40/47 |
| 2021/0335147 A1 | 10/2021 | Johnson et al. | |

* cited by examiner

*Primary Examiner* — Jay Trent Liddle
*Assistant Examiner* — Alyssa N Brandley
(74) *Attorney, Agent, or Firm* — Walker Griffin Weitzel; Alloy Patent Law (57) ABSTRACT

System and method for personalized book recommendations have been designed to align with a user's current vocabulary and facilitate sustainable vocabulary growth. By analyzing the user's vocabulary size and growth trajectory, the system can recommend books that are appropriately challenging yet comprehensible. This approach enables users to explore books of their choice more effectively, even before their vocabulary reaches a level sufficient for understanding any book in general. In addition, a vocabulary-based flashcard generator assistant system has been incorporated. This assistant system enables the user to rapidly create high-quality, personalized flashcards for optimal vocabulary acquisition. The flashcards contain content that is tailored to the individual's learning style and pace, further promoting sustainable and effective vocabulary growth. Together, these components offer a cohesive educational ecosystem that not only makes reading more accessible but also fosters an accelerated yet manageable rate of language development.

21 Claims, 5 Drawing Sheets

FIG. 1

| # | Book | | Current coverage | Difficulty level | |
|---|------|---|---|---|---|
| 46 | The perks of Being a Wallflower by Stephen Chbosky 59,974 words – published 1999 Young Adult Top 100 | ☆ | 98.42% | 96% ▫▫▫▫▫▫ Words to learn: 0 Per 100 pages: 0 | PLAN TO READ |
| 47 | The curious incident of the dog in the night-time, by Mark Haddon 59,724 words – published 2003 Young Adult Mystery & Thriller Top 100 | ★ | 97.63% | 98% ▫▫▫▫▫▫ Words to learn: 3 Per 100 pages: 1.3 | PLAN TO READ |
| 24 | The Alchemist by Paulo Coelho 38,123 words – published 1988 Fantasy Top 100 | ☆ | 96.37% | 99% ▫▫▫▫▫▫ Words to learn: 80 Per 100 pages: 52 | PLAN TO READ |
| 11 | The Catcher in the Rye by J.D. Salinger 69,930 words – published 1951 Young Adult Top 100 | ☆ | 96.81% | 98.5% ▫▫▫▫▫▫ Words to learn: 57 Per 100 pages: 20 | PLAN TO READ |
| 29 | Memoirs of a Geisha by Arthur Golden 161,092 words – published 1997 Historical Fiction Top 100 | ☆ | 96.15% | 99.75% ▫▫▫▫▫▫ Words to learn: 1078 Per 100 pages: 167 | PLAN TO READ |

FIG. 2

Unknown words for
The Catcher in the Rye
by J.D. Salinger

[EXPAND ALL] — 305  [CLEAR ALL] — 306  [MARK SELECTED AS NEW] — 307  [BACK]

Known words: 96.81%   Known+New: 96.97%   Known+New+Selected(2): 97.12%

| Rank | Headword | Book Frequency | Bookshelf Frequency | Tier | |
|---|---|---|---|---|---|
| 1 | > ☐ goddam | 244 | 256 | 5 | MARK AS NEW |
| 2 | > ☑ bastard | 58 | 70 | 4 | MARK AS NEW |
| 3 | > ☑ terrific | 50 | 52 | 4 — 309 | MARK AS NEW |
| 4 | > ☐ dough | 47 | 50 | 4 | MARK AS NEW |
| 5 | ∨ ☐ buzz<br>    Buzz, verb (58%)<br>    Buzz, noun (21%) — 308 | 20 | 54 | 4 | MARK AS NEW |
| 6 | > ☐ lousy | 48 | 52 | 7 | MARK AS NEW |
| 7 | > ☐ kidding | 42 | 56 | 6 | MARK AS NEW |

(304 points to Headword column; 301 to headword labels; 302 to Bookshelf Frequency; 303 to Tier)

FIG. 3

The Island of Dr. Moreau
by H.G. Wells
43,077 words
[Wells, H.G – The island of Dr. Moreau, epub]
Familiar words: 93.31% -> 94.45%

CLOSE BOOK

EXPAND ALL    401    402

| # | Headword | Count in the book | First position | Tier | |
|---|---|---|---|---|---|
| 1 | ∨ Puma<br>Puma, noun (100%) | 35 | 1% | 12 | Mark As |
| 2 | > beast | 125 | 1% | 4 | Mark As |
| 3 | > tangle | 10 | 2% | 4 | Mark As |
| 4 | > sway | 10 | 3% | 5 | Mark As |
| 5 | > growl | 9 | 4% | 5 | Mark As |
| 6 | > peered | 15 | 6% | 4 | Mark As |
| 7 | > clumsy | 17 | 6% | 6 | Mark As |
| 8 | > grotesque | 15 | 7% | 7 | Mark As |

403

Examples from the book
Then just overhead came a sound like an iron bedstead being knocked about, and the low angry growling of some large animal.
Then the noise overhead began again, a snarling growl and the voice of a human being together.
The growling overhead was removed, so suddenly and with so much savage anger that it startled me.
I heard the unseen dogs growl furiously, and forthwith he ducked back, coming into contact with the hand I put out to fend him off from myself.
They were not barking, but sniffing and growling in a curious fashion.

BOOK RECOMMENDATION AND FLASHCARD GENERATION

CROSS-REFERENCE TO RELATED PATENT DOCUMENTS

This patent application claims the benefit of priority of U.S. Provisional Application No. 63/229,494 entitled "SYSTEM AND METHOD FOR RECOMMENDING AND MATCHING BOOKS FOR USER BASED ON USER VOCABULARY AND USER VOCABULARY GROWTH TRAJECTORY," filed Aug. 4, 2021, and U.S. Provisional Application No. 63/283,997, entitled "CARD GENERATOR SYSTEM," filed Nov. 29, 2021, which are hereby incorporated herein by reference in its entirety.

FIELD OF THE INVENTION

The present invention is generally related to vocabulary-based book recommendation and flashcard generation. More specifically, the present invention discloses a system and method for recommending a plurality of books based on a vocabulary of a user. The present invention further discloses a vocabulary-based flashcard generator assistant system.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Generally, book reading is one of the best ways to learn a foreign language (e.g., English as a foreign language). However, a very small percentage of language learners read books in a foreign language because of the vocabulary gap. Typically, a reader needs to know about 98% of the words used in a book to comprehend in detail what is written in the book. To be able to understand 98% of the words used in most of the books, the reader must be familiar with approximately 9000-word families. The average learner of the foreign language knows roughly 3000-4000-word families. On average, a single book contains 4000-5000 different word families. Because some words occur more frequently than others in the book, around 3000-3500 of the most frequent word families in the book account for 98% of all the running words in the book. Because learners tend to know the most frequently and widely used words in the language, and because those frequent words have a high probability to be among the book's most frequent word families, the mismatch between the user's vocabulary and the book's 98% vocabulary is relatively low (somewhere between the tens and low hundreds of words). However, the readers are unlikely to know how big this mismatch is for any given book and which exact words/families they need to learn to optimally close the gap to a specific target familiarity (preferably 98% or more) of running words used in the book. If the user can see this mismatch and those exact words/families they need to learn to close the gap, they will realize that they can easily learn a relatively small number of words and be able to read the book with an adequate level of comprehension. Various computer-based vocabulary programs exist and are well known in the art. US patent application US20160155349A1 filed by JIAN; She-Che discloses a cloud-based vocabulary learning system that includes a cloud database and a learning server. The cloud database stores multiple vocabulary sets associated with different levels and is connected with the learning server. The learning server includes a processor and a memory. The processor executes instructions stored on the memory to receive a user-level from a client device. One of the vocabulary sets is selected as a user vocabulary set according to the user level, and an electronic document is compared with the user vocabulary set to extract new words in the electronic document. The new words are provided to the client device for learning and are added to the user vocabulary set after learning. However, the programs and features disclosed in the existing arts function in conjunction with various computer-based devices and programs such as word processors, e-mail programs, web page generation programs, and the like, to provide vocabulary assistance, such as definitions, meanings of prefixes, roots, and suffixes, and word origins.

In addition, information systems are very common to facilitate human learning processes that are targeted to achieve a specific purpose by helping a user review, learn, or memorize information using a flashcard system. The use of flashcards as memorization and learning tools is common and well-known in the learning community. Flashcards are generally used as a method to help the user review, learn, or memorize information in small pieces. Historically, flashcards have been written as a deck of paper or cardboard cards. On one side of the card is a question or prompt, and on the other side is the related answer. A number of Internet sites offer electronic versions of flashcards on various subjects. These electronic flashcards work in essentially the same way as paper flashcards and offer essentially the same benefit, albeit that the digital form factor allows easy Internet access. Accordingly, a need exists for flashcards to be enabled with the much greater functionality and benefit expected from modern Internet communities. For example, Internet communities should be capable of independently authoring one or more internet-based flashcard decks. Spaced repetition systems are an effective way to memorize different facts, including meanings or definitions of foreign words and expressions in such cards. The difficulty is in creating those cards. Creating cards manually is generally time-consuming and therefore language learners pretty quickly stop creating them on a regular basis or even are reluctant to start. There are many auto-generators that can produce a lot of cards in a short period of time, but the quality of cards is low in the sense that they are not personalized and use non-optimal (for each individual user) definitions and translations, dictionaries, examples, and layout.

Thus, in view of the above, there is a long-felt need in the industry to address the aforementioned deficiencies and inadequacies. Further limitations and disadvantages of conventional approaches will become apparent to one of skill in the art through comparison of described systems with some aspects of the present disclosure, as set forth in the remainder of the present application and with reference to the drawings.

BRIEF SUMMARY

It is an objective of the present invention to provide a method and a system for recommending a plurality of books based on a vocabulary of a user and matching user vocabulary growth trajectory with words used in those books are provided substantially, as shown in and/or described in connection with at least one of the figures.

In an embodiment, the present disclosure relates to a system for recommending a plurality of books based on a vocabulary of a user. The system includes a computing device, one or more processors, and a memory. The memory is coupled to one or more processors to store instructions executable by one or more processors. The processors are configured to perform operations comprising: creating a list of a plurality of word families for a plurality of users; collecting and tracking each user list of known and familiar word families; displaying the number and share of running words in a specific book familiar to the user in real-time; displaying the number of words/families to be learned by the user to reach a threshold level familiarity with the words used in the book, and also displaying a plurality of exact words/families that need to be learned by the user; displaying the number of times those words/families are used in a given book, the number of times those words/families are used in the books of the user reading backlog, and what those words/families' general language frequencies are; and facilitating the users to navigate over a plurality of uploaded books through a user interface of the computing device, wherein the books are uploaded by either the user or one or more system operators.

In an embodiment, the threshold level is 98% or higher. In an embodiment, the users upload their books and documents in a plurality of formats that includes, but are not limited to, TXT, HTML, EPUB, MOBI, AZW, AZW3, and AZW4. In an embodiment, the users select the words from the book they need to learn. In an embodiment, the users can pre-learn the selected words before reading and/or get a modified version of the book with the selected words highlighted or marked. The users can also choose to highlight/mark other words, e.g., the ones they have learned recently. In an embodiment, the users can pre-learn the selected words/families in the order the words are used in the book before reading the book. In an embodiment, the system and method use a metric of "unknown words/families to learn per 100 pages to reach target share of familiar running words" to analyze the books. The metric can be normalized on any other number of pages, a number of running words or other derived characteristics. The metric can be replaced by any other metric in a linear, near-linear, direct proportional or inverse proportional relationship with the described one. In an embodiment, the metric is used on individual books, series, or arbitrary collections of books.

An aspect of the present disclosure relates to a method for recommending a plurality of books based on a vocabulary of a user. The method includes a step of creating a list of a plurality of word families for a plurality of users. The method includes a step of collecting and tracking each user list of known and familiar word families The method includes a step of displaying the number and share of running words in a specific book familiar to the user in real-time. The method includes a step of displaying the number of words/families to be learned by the user to reach a threshold level of familiarity with the words used in the book. The method includes a step of displaying a plurality of exact words/families that need to be learned by the user. The method includes a step of displaying how many times those words/families are used in a given book, in the books of the user reading backlog, and what are their general language frequencies. The method includes a step of facilitating the users to navigate over a plurality of uploaded books through a user interface of the computing device, wherein the books are uploaded by either the user or one or more system operators.

An aspect of the present disclosure relates to a system and method for providing a platform for the learning of foreign languages (starting from English as a foreign language). Thus, the system may evolve into a more universal platform with many additional features, e.g., with the ability to create and maintain flashcards, etc. In an aspect, consumption of a lot of comprehensible content through reading is a key to advancing in language learning past some initial stages/levels. So, the platform based on the present invention will start by enabling/unlocking the ability to do this for the language learners (users).

Accordingly, one advantage of the present invention is that it allows a user to understand how many words they need to learn for a given amount of reading, thus limiting the amount of unknown vocabulary for a given reading session. Accordingly, one advantage of the present invention is that it provides a list of upcoming unknown words in a given book that will allow a user to prepare by learning upcoming unknown words. Accordingly, one advantage of the present invention is that it helps a user find a list of books that are appropriate to the user's vocabulary and learning goals. Accordingly, one advantage of the present invention is that it matches users' vocabulary and words used in the books. Accordingly, one advantage of the present invention is that it recommends books that are appropriate to the user's vocabulary. Accordingly, one advantage of the present invention is that it facilitates the user to learn optimal words and not necessarily the most frequent words in the given book. Thus, the users may choose to learn words/families less frequently in the given book, but more frequently in the user reading backlog and/or in the target language in general. Further, the learners can decide to optimize the word frequency in several books they are going to read and/or general word family frequency, etc. Accordingly, one advantage of the present invention is that it provides means to coordinate user reading and user vocabulary growth trajectory in a way that makes it possible for the user to read books of their choice written in a studied language before reaching a vocabulary size sufficient to read, with adequate comprehension, any book in general: all this while maintaining a sustainable speed of user vocabulary growth.

Another objective of the present invention is to provide a vocabulary-based review for the flashcard generator assistant. The present invention allows users to quickly create high-quality flashcards with personalized and optimal content. In an embodiment, a user obtains a list of words/word families to learn. The user may have access to the content of different dictionaries through the extended interface. For each word or family of words, the user may have a list of sentences/usage examples from uploaded documents. The users may then configure the personal layout of the generated flashcards and which elements they should contain. The user then chooses a word and a dictionary and sees definitions for the word (and usage examples from the uploaded documents). The user chooses a definition and an example, and the system generates a flashcard with this definition and this example. In an alternative embodiment, the card generator may be integrated into a book or document e-reader (which also might be optionally a part of the broader system). The user clicks on/touches (in the case of a touch-screen) a word in a sentence while reading and sees a dictionary article enhanced with card generation elements. The user can click/touch the card generation UI widget associated with a particular definition or definition's example sentence and the system will generate a flashcard for the word (optionally using the current book sentence as the card element.

These and other features and advantages of the present invention will become apparent from the detailed description below, in light of the accompanying drawings.

BRIEF DESCRIPTION OF THE ACCOMPANYING DRAWINGS

The novel features which are believed to be characteristic of the present invention, as to its structure, organization, use, and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the figures may be exaggerated, relative to other elements, to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components or set-ups, which constitutes a method and a system for book recommendation and flashcard generation. The present invention discloses recommending a plurality of books based on a vocabulary of a user and coordinating books and user vocabulary growth trajectory in such a way that makes it possible for the user to read books of their choice before reaching the vocabulary size sufficient to read, with adequate comprehension, practically any book in general while maintaining a sustainable speed of vocabulary growth. The present invention further discloses a vocabulary-based flashcard generator assistant system and allows users to quickly create high-quality flashcards with personalized and optimal content. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising," "having," "containing," and "including," and other forms thereof, are intended to be equivalent in meaning and be open-ended in that an item or items following any one of these words is not meant to be an exhaustive listing of such item or items or meant to be limited to only the listed item or items.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to or readily developed from known manners, means, techniques, and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein The process of book recommendation and flashcard generation will now be described with reference to the accompanying drawings which should be regarded as merely illustrative without restricting the scope and ambit of the present invention.

Figure 1:
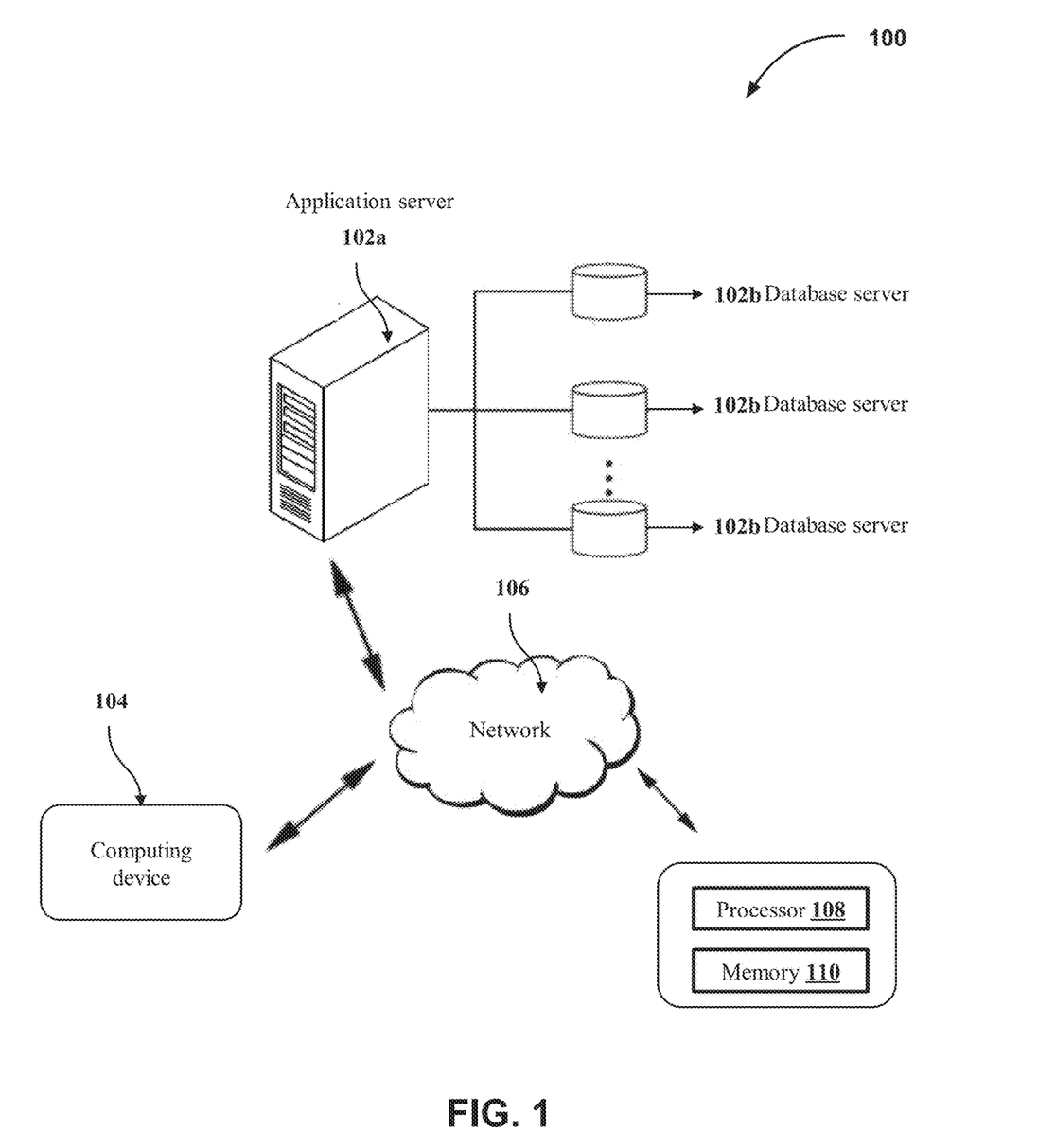
FIG. 1 is a diagram that illustrates a network implementation of the present system for recommending a plurality of books based on a vocabulary of a user, in accordance with an embodiment of the present subject matter.

FIG. 1 is a diagram that illustrates a network implementation of the present system 100 for recommending a plurality of books based on a vocabulary of a user, in accordance with an embodiment of the present subject matter.

The system environment 100 includes one or more computing servers such as an application server 102a, one or more database servers such as a database server 102b, and one or more networks such as a network 106. The system environment 100 further includes one or more user computing devices associated with one or more users such as a user computing device 104 associated with a user.

Examples of the user computing device 104 may include a smartphone, a tablet computer, a laptop, or any other portable communication device. The application server 102a and the user computing device 104 may communicate with each other over a communication network such as network 106. The application server 102a and the database server 102b may also communicate with each other over the same network 106 or a different network.

The application server 102a is a computing device, a software framework, or a combination thereof, that may provide a generalized approach to creating the application server implementation. Examples of the application server 102a include, but are not limited to, a personal computer, a laptop, or a network of computer systems. The application server 102a may be realized through various web-based technologies such as, but not limited to, a Java web framework, a .NET framework, a PHP (Hypertext Pre-processor) framework, or any other web application framework. The application server 102a may operate on one or more operating systems such as Windows, Android, Unix, Ubuntu, Mac OS, or the like. Various operations of the application server 102a may be dedicated to execution of procedures, such as, but are not limited to, programs, routines, or scripts stored in one or more memory units for supporting its applied applications and performing one or more operations.

In an embodiment, the application server 102a may be configured to facilitate or provide one or more features or provisions for recommending a plurality of books based on a vocabulary of a user. The application server 102a may be configured to perform operations comprising: creating a list of a plurality of word families for a plurality of users, collecting and tracking each user list of known and familiar word families, displaying the number and share of running words in a specific book familiar to the user in real-time, displaying the number of words/families to be learned by the user to reach a threshold level familiarity with the words used in the book, and also displaying a plurality of exact words/families that need to be learned by the user, displaying the number of times those words/families are used in a given book, the number of times those words/families are used in the books of the user reading backlog, and what those words/families' general language frequencies are, and facilitating the users to navigate over a plurality of uploaded books through a user interface of the computing device, wherein the books are uploaded by either the user or one or more system operators.

In an embodiment, the application server 102a may be configured to facilitate or provide one or more features or provisions to one or more users to generate the flashcards. For example, the application server 102a may facilitate or provide a list of words or words families to a user. The user may access the words/families through an interface rendered on the user-computing device 104 by the application server 102a. The user may use the words/families to learn. The application server 102a may further facilitate or provide different dictionaries. The user may access the content of different dictionaries through the extended interface rendered on the user-computing device 104 by the application server 102a. The application server 102a may facilitate or provide the uploaded documents. For each word/family, the user may access the list of sentences or usage examples from the uploaded documents rendered on the user-computing device 104 by the application server 102a. The application server 102a may render another interface (on the user-computing device 104) that can be used by the user to configure the personal layout of the generated cards and which elements they should contain. The user chooses a word and a dictionary and sees definitions for the word (and usage examples from the uploaded documents). Based on a definition and an example chosen by the user, the application server 102a generates a flashcard with this definition and example. Examples from the read books may help the user to create a better context for the learned words (the user can more vividly imagine/live through the context), and so better understand them and memorize them stronger and easier. The user can better understand the words from their family by learning all the family words in one session as facilitated by the application server 102a. The application server 102a provides one or more card layout pre-configurations for one or more types of flashcards, which the user can refer to select a favourite layout for creating the flashcard. The users can choose a word from a pre-created list, enter a word in an input element, or pick them directly from the text. There must be at least one option. Then, the users can use either a sentence from the uploaded document or an example sentence from the dictionary article to generate the flashcard.

In an embodiment, the application server 102a may be configured to create a list of a plurality of word families for the plurality of users. The application server 102a may be further configured to collect and track each user list of familiar word families The application server 102a may be further configured to facilitate the user to navigate through a user interface of the computing device 104 over the plurality of books and book collections indicating for the books and collections, a current share of familiar running words, and number of word families to be learned to reach various familiarity levels. The books or book data are provided by either the user or one or more system operators. The application server 102a may be further configured to display through a user interface of the computing device 104 a plurality of unfamiliar word families in a selected book or a book collection with number of times those word families are used in this book or book collection.

The database server 102b may include suitable logic, circuitry, interfaces, and/or code, executable by the circuitry that may be configured to perform one or more data management and storage operations such as receiving, storing, processing, and transmitting queries, data, content, algorithms, code, or the like. In an embodiment, the database server 102b may be a data management and storage computing device that is communicatively coupled to the application server 102a or the user computing device 104 via the network 106 to perform one or more operations. In an exemplary embodiment, the database server 102b may be configured to manage and store one or more profiles of the one or more users. In an exemplary embodiment, the database server 102b may be further configured to manage and store one or more words and families of the one or more words in different languages. In an exemplary embodiment, the database server 102b may be further configured to manage and store one or more pre-configured layouts for one or more types of flashcards. In an exemplary embodiment, the database server 102b may be further configured to manage and store one or more algorithms, rules, code, or the like that are retrieved and executed by the application server 102a to perform the one or more designated operations in the real-time. In an exemplary embodiment, the database server 102b may be further configured to manage and store one or more notifications. In an embodiment, the database server 102b may be further configured to receive a query from the application server 102a for retrieval of the stored information. Based on the received query, the database server 102b may communicate the requested information to the application server 102a. The database server 102b may be implemented by means of a personal computer, a laptop, or a network of computer systems. Examples of the database server 102b may include but are not limited to, MongoDB, Cassandra, and HBase, or Structured Query Language (SQL) database.

The network 106 may include suitable logic, circuitry, interfaces, and/or code, executable by the circuitry that may be configured to transmit messages and requests between various entities, such as the application server 102a, the database server 102b, and the user computing device 104. Examples of the network 106 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the system environment 100 may connect to the network 106 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Although the present subject matter is explained considering that the present system 100 is implemented on the server 102a, it may be understood that the present system 100 may also be implemented in a variety of computing devices 104, such as a laptop computer, a desktop computer, a notebook, a workstation, a mainframe computer, a server, a network server, and the like. It will be understood that the present system 100 may be accessed by multiple users through one or more computing devices, collectively referred to as the computing device 104 hereinafter, or applications residing on the computer device 104. Examples of the computing devices 104 may include, but are not limited to, a portable computer, a personal digital assistant, a handheld device, and a workstation. The computing devices 104 are communicatively coupled to the server 102a, and the database 102b through the network 106 and utilizes the various operating systems (such as Android®, IOS®, Windows®, etc.) to perform the functions of the present system.

In one implementation, the network 106 may be a wireless network, a wired network, or a combination thereof. The network 106 can be implemented as one of the different types of networks, such as an intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 100 includes one or more processors 108 and a memory 110. The processor 108 may be implemented as one or more microprocessors, microcomputers, microcontrollers, digital signal processors, central processing units, state machines, logic circuitries, and/or any devices that manipulate signals based on operational instructions.

The memory 110 is coupled to the one or more processors 108 and stores program instructions executable by the one or more processors 108. The memory 110 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory 110 may include various modules. The memory 110 includes routines, programs, objects, components, data structures, etc., which perform particular tasks or implement particular abstract data types.

The processors 108 may be configured to perform operations comprising: creating a list of a plurality of word families for a plurality of users, collecting and tracking each user list of known and familiar word families, and displaying the number of running words in a specific book known to the user in real-time, displaying the number of words/families to be learned by the user to reach a threshold level familiarity with the words used in the book, and also displaying a plurality of exact words that need to be learned by the user, and facilitating the users to navigate over a plurality of uploaded books through a user interface of the computing device 104, wherein the books are uploaded by either the user or one or more system operators. Examples of the users include but are not limited to, a book reader, a learner, an educator, a researcher, a publisher, etc.

In an embodiment, the processor 108 may be configured to create a list of a plurality of word families for the plurality of users. The processor 108 may be further configured to collect and track each user list of familiar word families The processor 108 may be further configured to facilitate the user to navigate through a user interface of the computing device 104 over the plurality of books and book collections indicating for the books and collections, a current share of familiar running words, and the number of word families to be learned to reach various familiarity levels. The books or book data are provided by either the user or one or more system operators. The processor 108 may be further configured to display through a user interface of the computing device 104 a plurality of unfamiliar word families in a selected book or a book collection with the number of times those word families are used in this book or book collection.

In an embodiment, the users access the features of the present invention through one or more of a mobile application and a web application. In an embodiment, the threshold levels are in the range of 98% to 100%. In an embodiment, the users upload their books and documents in a plurality of formats that includes, but are not limited to, TXT, HTML, EPUB, MOBI, AZW, AZW3, and AZW4. In an embodiment, the users select the words/families from the book they need or want to learn. In an embodiment, the users can either pre-learn the selected words before reading and/or get a modified version of the book with the highlighted, or marked in some other way, selected words. In an embodiment, the users can choose to highlight or mark in some other way words in other statuses (or combination of statuses), e.g., 'New', or 'New' and 'In Progress', etc. Words in different statuses can be marked in the same or different ways. In an embodiment, the users can pre-learn the selected words in the order the words are used in the book before reading the book.

In an embodiment, the system and method use a metric of "unknown words/families to learn per 100 pages to reach target share of familiar running words" to analyze the books. The metric can be normalized on any other number of pages, number of running words or other derived characteristics. The metric can be replaced by any other metric in a linear, near-linear, direct proportional, or inverse proportional relationship with the described one. In an embodiment, the metric is used on individual books, series, or arbitrary collections of books.

Running words might include all the words in the book or there might be some arbitrary omissions, e.g., articles, nonsense words, proper names, etc.

Terms 'familiar running words', 'running words known to the user', 'share of familiar running words' and so on include running words that are actually tracked as familiar to the user, for example, members of the tracked familiar word families, and also may include words considered as comprehensible for the user even if not tracked as familiar or words that do not have lexical meaning, for example, various proper names, nonsense words, etc.

As used herein, and unless the context dictates otherwise, the term "configured to" or "coupled to" is intended to include both direct coupling (in which two elements that are coupled to each other contact each other) and indirect coupling (in which at least one additional element is located between the two elements). Therefore, the terms "configured to", "configured with", "coupled to" and "coupled with" are used synonymously. Within the context of this document terms "configured to", "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

In the context of this disclosure, the term 'book' can be extended to any document containing (but not limited to) text in any format. This is especially true for user-loaded books.

"Word family" refers to a group of words that would be perceived as the same word for the receptive skills of listening and reading (e.g. {build, building, builder} or {develop, developer, development, developmental ... }). In an aspect, a word family is a number of the words, and not individual lemmas (like develop, developer, development, etc. belong to a one-word family with the headword—develop). It is important because when reading/listening, words within one family are perceived as one unit, with some common meaning—if the learner knows the meaning of at least one word from the family, not necessarily the headword, it is very easy for them to deduce the meaning of other family members.

Grouping words and counting families dramatically decreases the number of items to learn in a book to reach target coverage (e.g., 98% known running words) since families are usually represented in the book by several of their members. It allows to better select which items to learn. Suppose some word family has seven members and each member is used 1 time in the book. If we searched for the most frequent words/lemmas in the book, we would probably not pay attention to these family representatives, considering them very infrequent in the book. However, if we search for the most frequent word families, we will consider this same family as occurring 7 times, i.e., quite frequently.

The cognitive load for a language learner is almost the same whether they learn one new word, or an entire new family (as most family members have predictable definitions derived from the definition of the headword and definition of the forming affix: builder->build+er, runner=run+er; or slowly=slow+ly; fastly=fast+ly, etc).

It also allows to better determine which words are truly known/unknown to the user. If the reader learned the word 'sparse' in one book, the word 'sparsely' would be counted as unknown for the next book if we were considering individual words. However, the meaning of the word 'sparsely' would be very transparent for the learner if they learned the word 'sparse', and it should be rather counted as known.

"Headword" refers to "main" word in the word family Most of the other words in a family are created from a headword using prefixes, suffixes, affixes, etc.

In different embodiments, words may be organized into families differently, including border-line case of one distinct word or lemma per family. For example, words 'nation' and 'nationalization' may be grouped into the same or different families even though they have the same stem. Sometimes, terms 'words' and 'words families' may be used interchangeably in this document.

In an embodiment, users can see the words or lemmas comprising a family

According to an embodiment herein, the system of the present invention helps language learners find books that are within their reach in terms of words they know or need to learn to read with adequate comprehension or at a certain enjoyment level, based on the percentage of unknown words.

Users of the present system go through a predefined list of word families and mark families they are familiar with. In an alternative embodiment, the users upload a list of words (as free text) they are already familiar with, and the system will relate words to the word families and mark them as having a specific status for the user.

In an embodiment, the users can see families with different statuses (e.g., Unknown, New, In Progress, Known/Learned) and mark them with different statuses. The number, semantics, and names of the statuses can be different in different embodiments.

In an embodiment, 'Unknown' means that a word family is not familiar to a user, 'New' means the user plans to learn words from this family (e.g. because they are frequent in the book the user is reading/going to read), 'In progress' means the user started learning the word family (e.g. looked up the word's definition in a dictionary), 'Known/Learned' means the user considers a word family permanently learned (i.e., unlikely to be forgotten in near future).

In operation, based on the collected info, the users can go to the user interface where they are shown how many running words in different books they know, and how many words/families they need to learn to reach the necessary level familiarity (e.g., 98%) with words used in the book, which exactly words/families those would be. The books are provided by the system operators for user visualization. The users can filter their list by different parameters, e.g., genre, author, series, search by title/author and other book metadata, sort by difficulty, and see aggregated statistics for the series (as if the entire book series is represented by one book), etc. Further, the users can also upload books from their collection (different formats supported) and see the same words statistics.

Users can go to the page associated with any chosen book and see how many times unknown word families are used in this book, in the books on the bookshelf (user reading backlog), and also see families' general language frequency. By sorting this list by any from the above-mentioned parameters (or some score including several of them), the user can choose words they need to learn to optimally reach desired coverage (by learning the minimal number of words but potentially taking into account their bookshelf frequency and/or general language frequency).

In an embodiment, the user may see the unknown word families in the book sorted by the score used by a bookshelf projected coverage algorithm.

After the user chooses the words and marks them with corresponding status (e.g., New), they can see those words on a dedicated page. Also, the user can set a 'current book' in the system (by uploading their copy or choosing from books provided by system operators). In this case, the user will be able to see statistics of the usage of words/families in different statuses (including 'New') of the uploaded book, including how many times words/families are met in the book and in which order (and in what approximate location, represented as a %) they occurred for the first time. This gives the user ability to start reading without pre-learning all the selected words for the book, and instead only the earliest occurring ones.

In the case of the current book uploaded from a personal collection, or book content publicly available for reproduction, or in cases where there is permission from people or entities holding corresponding rights to the book content, the user is able to see word usage examples from the book. This will allow users to pre-learn only necessary words and meanings from the big multiword/multi-meaning families.

In an embodiment, the user additionally may mark or upload a collection of the books from which they want to see word usage examples (including but not limited to already read books, books on the bookshelf etc.) and see examples from the entire collection.

As an alternative to or in addition to pre-learning, the system will provide the user with an opportunity to upload and get a modified version of the book with selected (e.g., 'New' and 'In Progress' or any other combination of statuses) words highlighted or marked in any other way. This way users will have the opportunity to differentiate while reading between the unknown words they should learn (e.g., look up the highlighted word in a dictionary) and unknown words they choose to ignore.

According to an alternative embodiment, there are various user interfaces for collecting words familiar to the user. In an embodiment, the words can be organized in the word families differently. In an embodiment, the books display their difficulty level using a sequence of color-coded bars (e.g., from green through yellow to red+shades). Various familiarity levels may be. color-coded depending on a corresponding numerical value of the metric. Each colored bar corresponds to some target percentage of familiar words in a book (say 96%-98%-98.5%, 99%-99.5%-99.75%-100%). Specific target levels can be changed and configured by each user individually. In other embodiments, book(s) difficulties can be expressed through other means including, but not limited to, sequences of other shapes of different colors and/or sizes, gradient/color ranges or any other way allowing users to see simultaneously how many (not necessarily precisely) words/families they need to learn to reach one or more different threshold levels.

Default color levels are determined as follows:

The metric determining a bar color is based on how much text (e.g., how many pages) of the book a user will be able to read on average per one learned word family. The average page may be set, for example, to be equal to 250 words. The page can be set to any other number of words. The metric can be replaced by any other metric in a linear, near-linear, direct proportional or inverse proportional relationship with the described one. The substantial part is that metric gives a user a clear understanding of how many words (not necessarily precise numbers) need to be learned to enable a certain amount of reading at a given familiarity threshold.

For example, if a book has 500 pages, and to reach 98% coverage, the user needs to learn 50 words, the color defining metric would be equal to 10 pages per learned word. Thus, if a user grows their vocabulary with a speed of 5-word families per day, they will be able to read on average 50 pages a day (of that book). Metrics also may be applied to a collection of books, e.g., a book series or books on the user bookshelf.

Default boundaries for different colors:
>=10 pages/word_family
(dark green)
>=6.5 pages/word_family
>=4 pages/word_family
>=2.5 pages/word_family
>=1.5 pages/word_family
>=1 page/word_family
(dark red)

In an aspect, the default color metric cut-offs/levels can be changed and configured by users individually. According to an embodiment herein, the difficulty metric applies not only to individual books but also to book collections where the collection is just considered as a large book. In an embodiment, the present system provides a series page and an entire bookshelf page on the user interface of the application.

The term 'bookshelf' or 'reading backlog' in this disclosure refers to the dedicated tracked collection of books or other reading materials. In an embodiment, this is a collection of reading materials that the user intends to read. In different embodiments, this may be an ordered or unordered collection.

According to an embodiment herein, on the bookshelf page, the user can choose the target coverage level (word(s) familiarity) for all the books and see how many words they need to learn for this book, and for the next books incrementally (i.e., projected coverages and difficulties).

The present specification provides an example of a bookshelf of two books. The user can choose 99% coverage for the first book, and 99% coverage for the second book. The user will see that to achieve their goal, they would need to learn +100 word families for the first book and +45 word families (additionally; 145 families total for the bookshelf) for the second book. Alternatively, they can choose 98% for the first book and 99% for the second book, and they will see that they need to learn +65 and +50 words/families respectively.

Of course, the bookshelf can contain any reasonable number of books. Users can tune target levels for each book on the bookshelf individually and with any increment, e.g., 0.1%. Upon changing/tuning target levels and/or adding/removing/rearranging the books, users will be able to see how that will reflect on the vocabulary learning curve.

The system can select and count word families to learn in different modes, e.g., greedy mode (which is based on word families' frequency in each individual book only). Another mode is able to account for general word families' frequency in a language and/or for word families' frequencies in the bookshelf as a whole or in a part of the bookshelf past a given book.

The above-described logic and procedure for assessing the learning curve can be applied to any book collection and is not limited to the user bookshelf—e.g., application to a book series.

This feature will allow users to better plan and align their future reading with their new vocabulary learning speed.

One important consequence of this feature is that the system now knows how the user's known vocabulary will look after the user reads all the current books of the bookshelf. This leads us to the following feature:

When a user chooses which books to put onto a bookshelf for further reading, they might be interested not only in the current difficulty of the book (especially if they are going to read it after the ones that are already on the bookshelf). Rather, they are interested in what would be the difficulty of the book exactly at the time when they will read it (supposedly after all the books currently on the bookshelf).

And because of the previous feature, we know exactly (provided that the users will follow the word recommendation algorithm) which word families users will know after finishing the current bookshelf. Based on this knowledge, we can display for a user a projected difficulty of the books (difficulty after finishing the current bookshelf).

The user interface (UI) element might be similar to the element for the current difficulty (e.g., colored bars; just one more sortable column in the table) or anything else.

Furthermore, when the user scans the book collections, they can mark some books (or an entire series) as favorites (because they are within reach or because of any other reason). After users finish scanning (or at any other moment), they can click on the dedicated link on the UI and see only the books they marked as favorite (and perform any common operations with these books).

In an additional embodiment, while the user can see words' frequencies, words' order in the book, and sentences with the words if the book copy is uploaded by the user, the user can also see word frequencies and word order in the library books (books uploaded by the system operators) when setting one of these books as a current book.

In an embodiment, the system may track and optionally keep a history of when word/families obtained their status (e.g., Known/Unknown/In Progress/New). The user can mark (and/or unmark) any book (one or multiple; pre-uploaded by system operators and/or uploaded by the user) as read and optionally set a date when it was read. The system calculates, and users can see statistics on how many times any word family has been met in the books they already have read and/or in how many books. These statistics can be aggregated per book and/or per time interval. If the system tracks when word/families obtained their status, the statistics can also optionally be decomposed per word/family historical statuses. This info can help users, for example, to decide when it is time to move a word family from a status 'In Progress' to 'Known' (e.g., criteria might be 3 weeks in 'In Progress' status and/or met 10 times in at least two books). Transition can happen manually or automatically based on pre-configured criteria.

Another example of word/families usage statistics in reading books would be that the user can sort 'Unknown' words/families by frequency of past occurrences and check if incidental learning from context occurred for the most frequently met word/families and if they already learned particular word families implicitly. Another example would be that a user might sort 'Known' words by frequency of past occurrences (in all read books and/or in some number of recently read books) and check if forgetting definitions occurred for the least used words/families (in which case the user might mark these words/families with different status, e.g. 'In Progress').

According to an embodiment herein, word families in many places/tables throughout the application have a list of their most common members ranged by general language frequency so that the user knows which lemmas to look up in a dictionary and concentrate on when learning the word family. For example, the words 'government' and 'governor' belong to the word family associated with the headword 'govern'.

The user can see, that in general, the most frequent members of this family are 'government, noun' (84% of all occurrences in the language) and 'governor, noun' (9%). Headword 'govern, verb' accounts for 1%. General frequencies in the language are determined based on the analysis of some recognized language corpora.

In an embodiment, the present system may provide UIs, tools, and widgets coupled with spaced repetition to create and use digital flashcards for learning/memorizing words/lemmas.

In an embodiment, flashcard repetition outcomes are integrated with the words/families transitions between statuses. E.g., a word family can automatically go from status 'New' to 'In progress' as soon as at least one flash card is created dedicated to one of the family members. E.g., a word family can go from the status 'In Progress' to the status 'Known/Learned' as soon as all cards dedicated to the family members were successfully reproduced/remembered during a time interval of at least three weeks. E.g., a word family can go from the status 'Known/Learned' to 'In progress' as soon as the user failed to remember/reproduce a flash card dedicated to one of the family members. All the states, states transitions, rules, and exact time intervals are exemplary and can be configured by users individually.

In an embodiment, the system instead or in addition to tracking and analyzing occurrences of words/families tracks/analyzes phrasal verbs (e.g., 'break down' 'put up with' etc.) and/or idiomatic phrases/expressions (e.g. 'hold your tongue', 'spill the beans' (defined as telling people secret information), etc.). All the procedures, methods, counts, interfaces, metrics, statuses etc. described in the present disclosure in relation to words/families are applied (entirely or selectively) to phrasal verbs and/or idiomatic expressions.

In an embodiment, the application server 102*a* (or the processor 108) may be configured to create a list of a plurality of word families for the plurality of users. The application server 102*a* (or the processor 108) may be further configured to collect and track each user list of familiar word families. The application server 102*a* (or the processor 108) may be further configured to facilitate the user to navigate through a user interface of the computing device 104 over the plurality of books and book collections indicating for the books and collections, a current share of familiar running words, and the number of word families to be learned to reach various familiarity levels. The books or book data are provided by either the user or one or more system operators. The application server 102*a* (or the processor 108) may be further configured to display through a user interface of the computing device 104 a plurality of unfamiliar word families in a selected book or a book collection with the number of times those word families are used in this book or book collection. The application server 102*a* (or the processor 108) may allow the user to add and remove the books and book collections to a user reading backlog and displays the plurality of unfamiliar word families in the selected book or the book collection with the number of times those word families are used in this book or book collection and the number of times those word families are used in books of the user reading backlog. The application server 102*a* (or the processor 108) may allow the user to set a target familiarity level for the books or book collections in the backlog and displays a projected share of familiar running words and a projected number of word families the user needs to learn to reach the set target familiarity level for each book or collection in the user's reading backlog incrementally under an assumption that the user will learn all the word families recommended for preceding books in the backlog. There may be a mode to display to the user a projected share of familiar running words and a projected number of word families the user needs to learn to reach various familiarity levels for a book or a book collection under an assumption that the user will learn all the word families recommended for the books of a current reading backlog at their set target familiarity levels. The application server 102*a* (or the processor 108) may visualize for the books or book collections a metric of normalized numbers of word families to be learned to reach various familiarity levels. The application server 102*a* (or the processor 108) may perform the normalization that is done to a size of a book. The various familiarity levels may be color coded. Various familiarity levels may be. colorcoded depending on a corresponding numerical value of the metric. The metric may be normalized on any number of pages, the number of running words or other derived characteristics. The metric may be replaced by any other metric in a linear, near-linear, direct proportional or inverse proportional relationship with the described one. The metric may be used on individual books, series, or arbitrary collections of books. The familiarity levels of the books may include range from 95% and higher. The user provides the books and documents in a plurality of formats that includes at least EPUB or MOBI. The user may select the word families which the user wants to learn from the selected book or book collection and the system displays combined share in the book or book collection of familiar running words and running words belonging to the selected word families. The application server 102*a* (or the processor 108) may track the word families that the user chose to learn and show an order of their first usage in the book or book collection so that the user can pre-learn them in that order and start reading before learning all the chosen words families used in the book or book collection. The application server 102*a* (or the processor 108) may track the word families that the user selected to learn and where the user can select a word family and see usage examples of the words of this family in user-provided books. The application server 102*a* (or the processor 108) may track the word families that the user selected to learn and provides the user with modified versions of the books with the words of the selected word families highlighted or marked. In an embodiment, the application server 102*a* (or the processor 108) may be further configured to provide words or families of words to the user, wherein the user uses the words or families of words to learn. The application server 102*a* (or the processor 108) may be further configured to provide one or more dictionaries. The user may access the content of the one or more dictionaries through an extended interface.

In an embodiment, the application server 102*a* (or the processor 108) may be further configured to provide uploaded documents, wherein the user, for each word or family, accesses a list of usage examples from the uploaded documents. The user may choose a word and a dictionary and sees definitions for the word and usage examples from the dictionary and the uploaded documents.

In an embodiment, the application server 102*a* (or the processor 108) may be further configured to provide a user interface that can be used by the user to configure a personal layout for generating a flashcard. The user chooses a definition and one or more examples for generating the flashcard with this definition and the examples.

In an embodiment, the application server 102*a* (or the processor 108) may be further configured to create and facilitate a learning trajectory which allows the user to choose how aggressively the user would like to proceed with learning new words.

Figure 2:
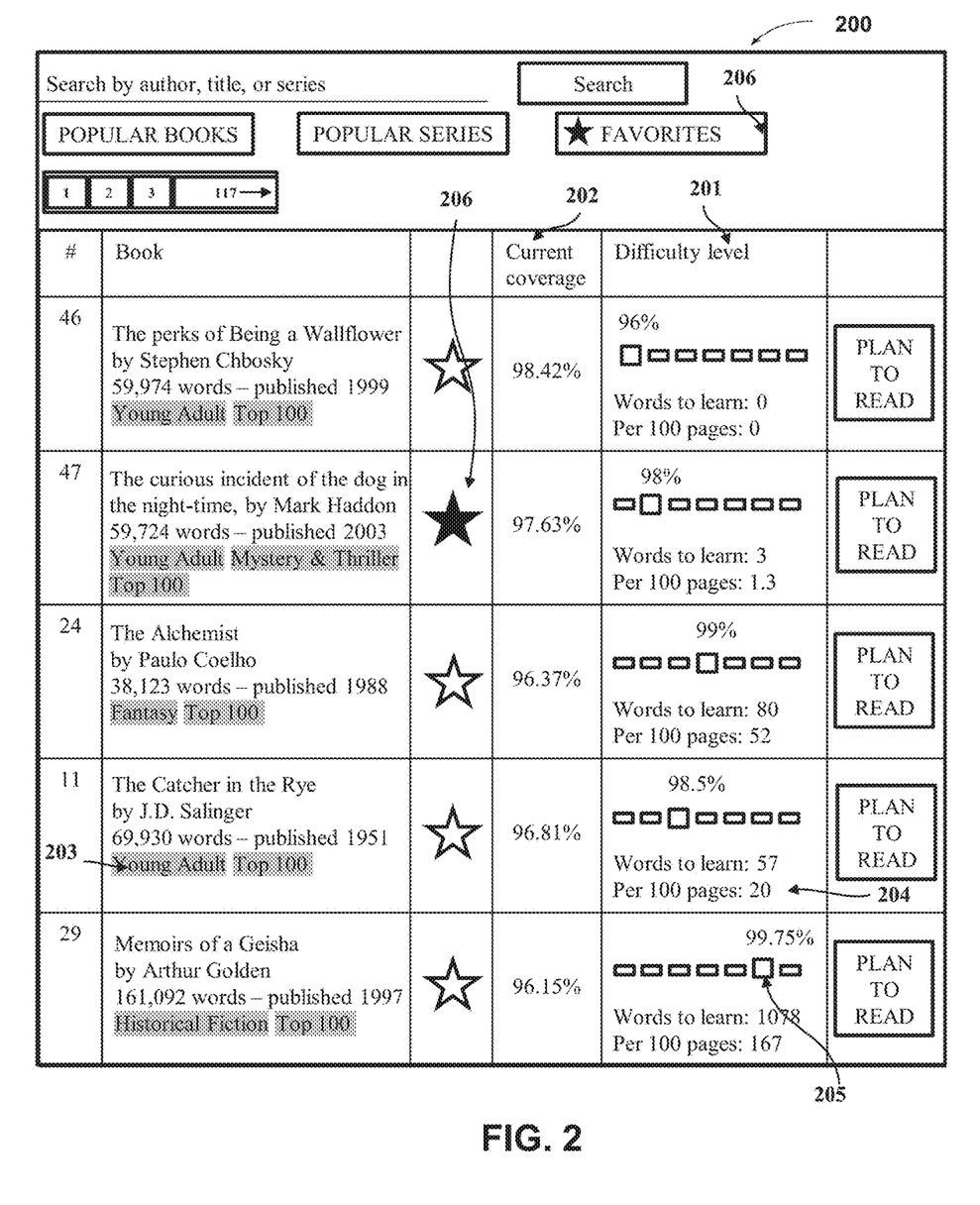
FIG. 2 is a schematic representation for illustrating a user interface of a book search, in accordance with an embodiment of the present subject matter.

FIG. 2 is a schematic representation for illustrating a user interface 200 of a book search, in accordance with an embodiment of the present subject matter. The user interface displays a difficulty level 201, current coverage 202, category 203, per 100 pages count 204, difficulty percentage 205, and a favorite bookmark 206. The table continues beyond the figure boundaries. Firstly, the user can see and sort books by difficulty. Then the user can see and sort by current share of familiar words in a book. Next, the user can see and filter books by genre. Thereafter, the user can click to see the screen with the recommended words to learn for a given book with their usage statistics (see FIG. 3). Furthermore, the difficulty is displayed using a sequence of color-coded bars, bar position in a sequence corresponds to the threshold familiarity level, color corresponds to normalized approximate number of word families to learn to read at given threshold, exact number of word families to learn displayed below the sequence upon clicking on the bar. Lastly, the user can mark books as favorite and later see them in a dedicated interface/page.

Figure 3:
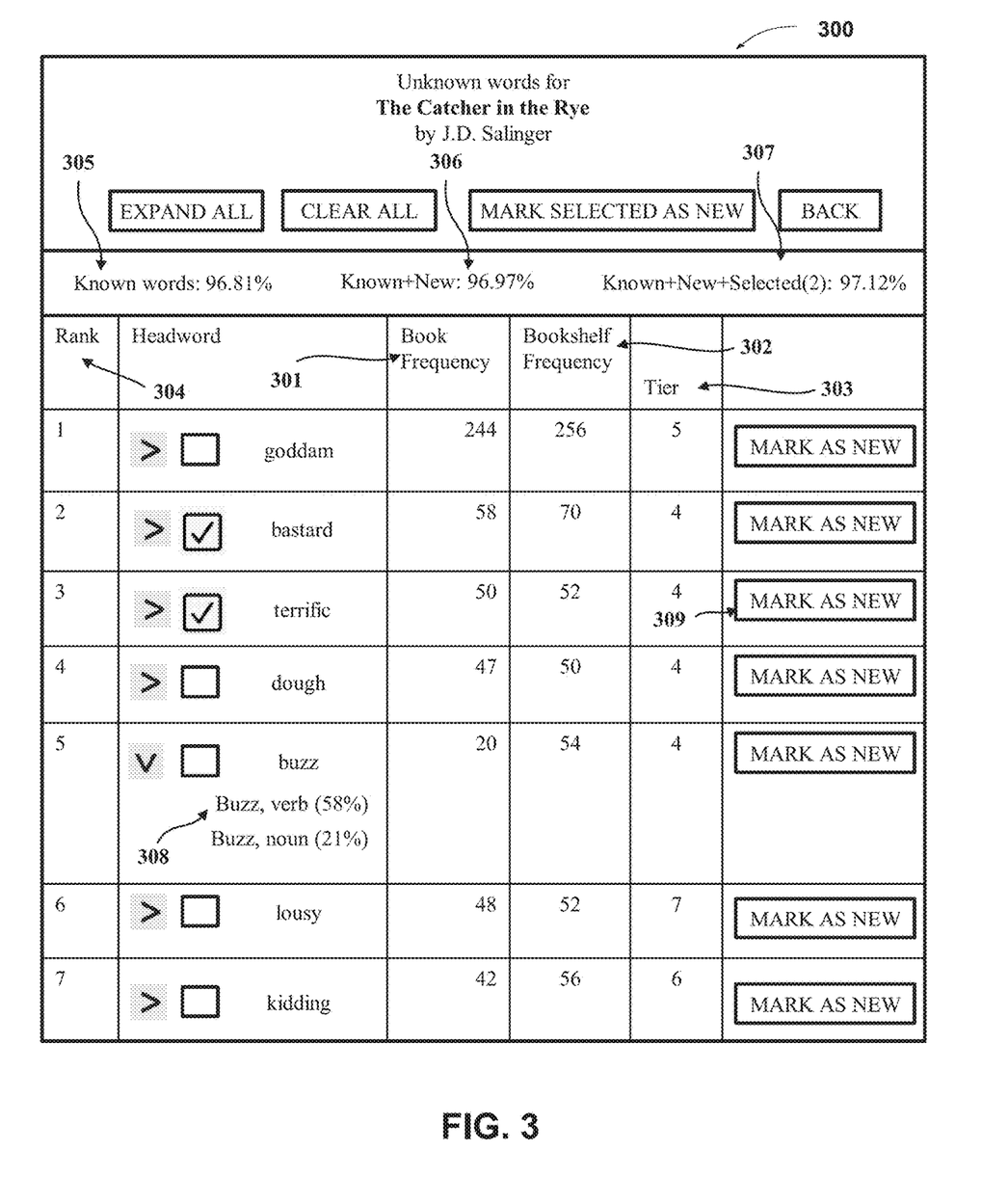
FIG. 3 is a schematic representation for illustrating a user interface of 'Unknown words in a book', in accordance with an embodiment of the present subject matter.

FIG. 3 is a schematic representation for illustrating a user interface 300 of 'Unknown words in a book', in accordance with an embodiment of the present subject matter. The user interface 300 displays a book frequency 301, bookshelf frequency 302, a tier number 303, a rank 304, known words percentage 305, known+new percentage 306, known_new+ selected percentage 307, headword percentage 308, and mark 309. The table continues beyond the figure boundaries. Firstly, for each headword/family, a user can see (and sort by) the number of occurrences of this family in the book. Then, for each headword/family, a user can see (and sort by) the number of occurrences of this family in the user bookshelf (reading backlog). Further, for each headword/family, a user can see (and sort by) a general frequency of this family in the language (expressed as word family tier, e.g., tier 1 roughly corresponds to the 1000 most frequent word families in the language, tier 4—to the fourth thousand of the most frequent families in the language). Then, a user can sort headwords/families by a score taking into account the number of occurrences of the family in the book, in the bookshelf, and the general language frequency of that family. Further, the user can see in real-time the share of familiar (running) words in the book. Furthermore, the user can see in real-time the combined share of familiar words and words marked with the status 'New' (chosen for learning) in the book; the user can see in real-time the combined share (in the book) of (306) and words selected on the page but not yet marked with different (from Unknown) status. Then the user can see the word family members/lemmas and their relative (in the scope of the family) frequency in the language. Lastly, the user can mark any word as having 'New' status (can be replaced with an element, e.g., a dropbox, allowing to mark a family with any arbitrary status).

Figure 4:
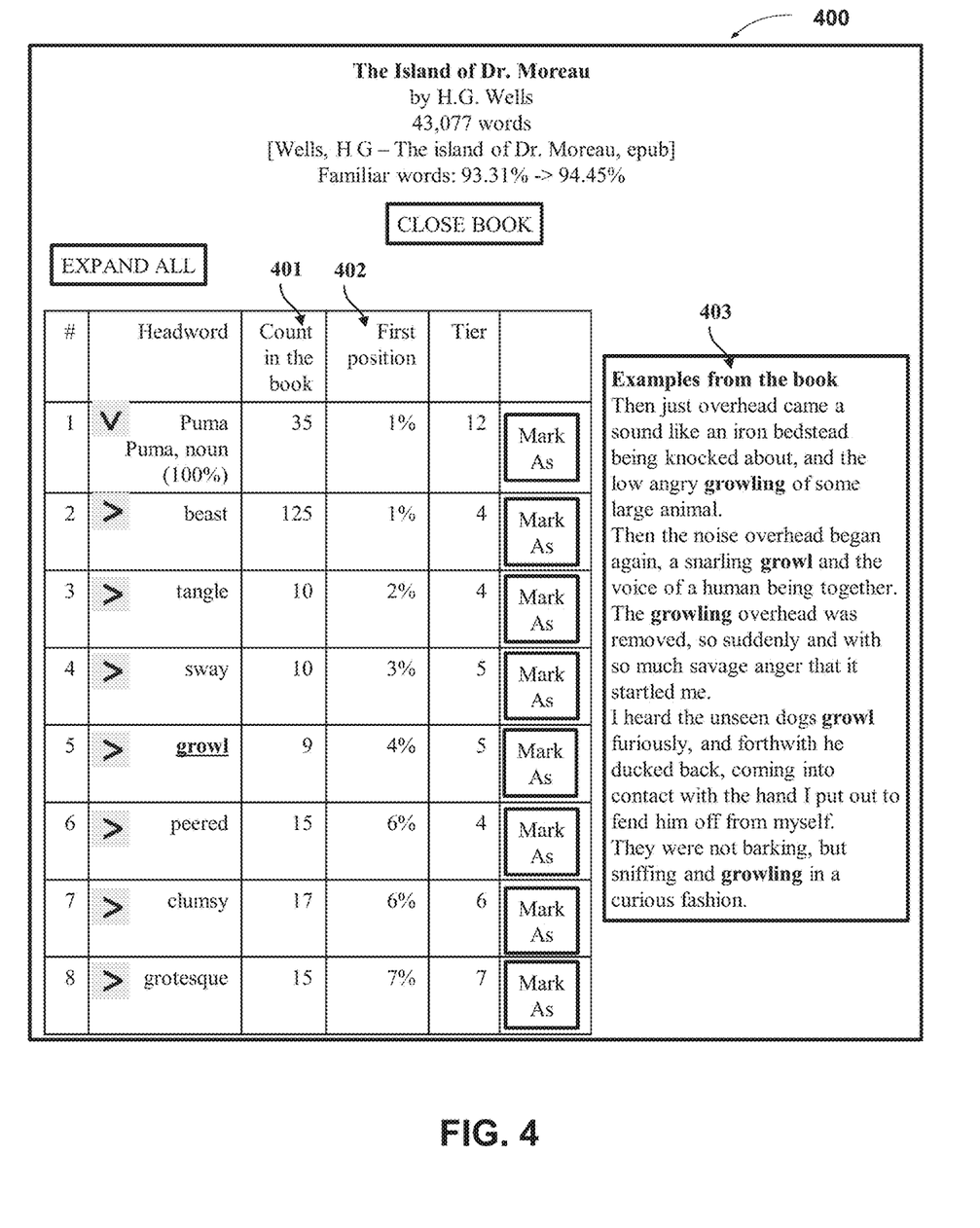
FIG. 4 is a schematic representation for illustrating a user interface of 'Current book', in accordance with an embodiment of the present subject matter.

FIG. 4 is a schematic representation for illustrating a user interface 400 of 'Current book', in accordance with an embodiment of the present subject matter. The user interface 400 displays a count in the book 401, a position-based percentage 402, and examples from the book 403. The table contains words in status 'New' (selected for learning) and continues beyond the figure boundaries. Firstly, for each headword/family, a user can see (and sort by) the number of occurrences of this family in the book. Then, for each headword/family, a user can see (and sort by) the approximate position (in %) of the first occurrence of the family in the book. Further, for each selected headword/family, the user can see examples of the usage/sentences of this family from the book.

Thus, the present system and method provided allow the user to understand how many words they need to learn for a given amount of reading, thus limiting the amount of unknown vocabulary for a given reading session. The present system and method provide a list of upcoming unknown words in a given book that will allow a user to prepare by learning upcoming unknown words. Furthermore, the present system and method help the user to find a list of books that are appropriate to the user's vocabulary and learning goals and coordinate user vocabulary growth trajectory (what they learn and at which pace) with the consumed content.

Figure 5:
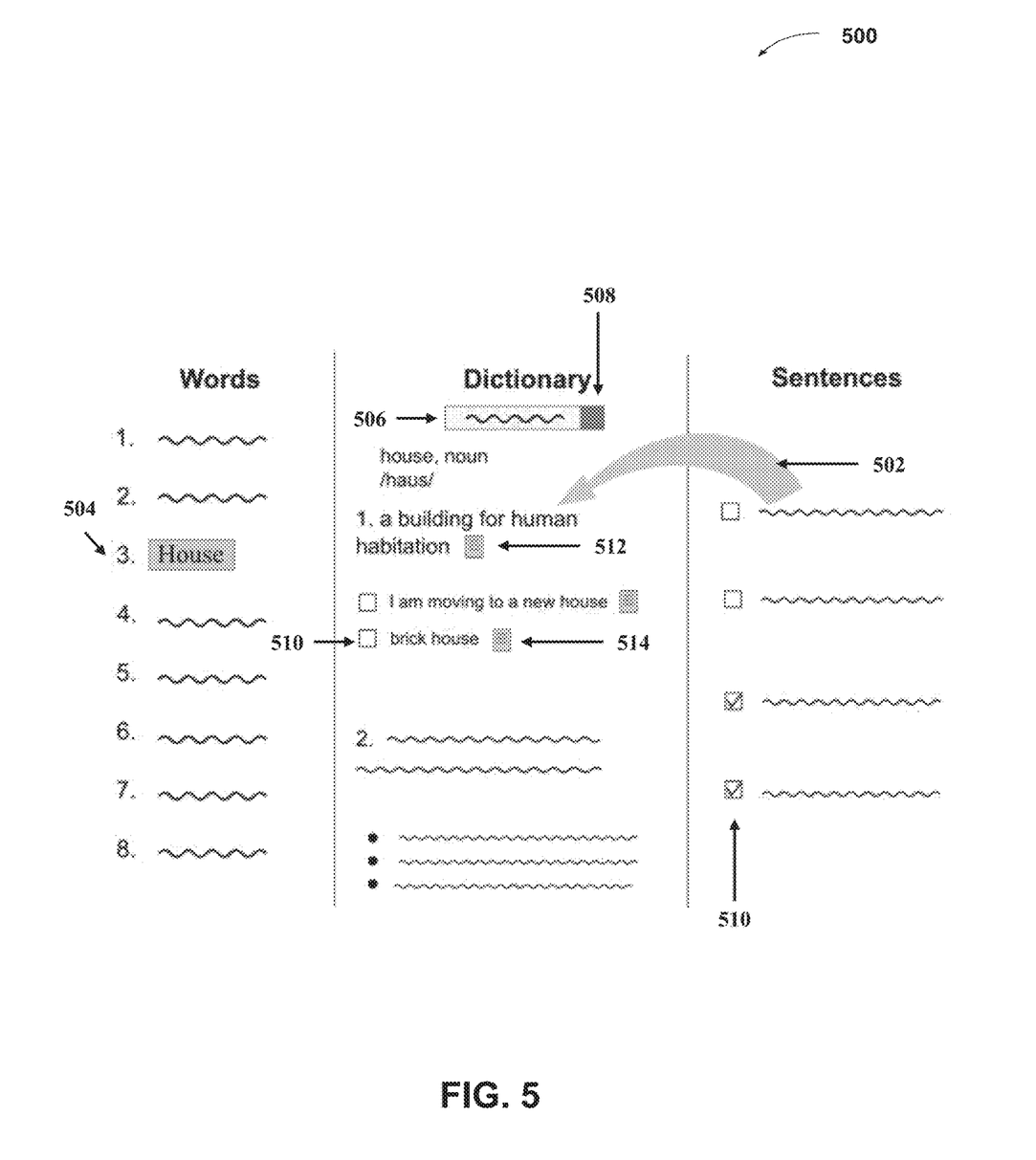
FIG. 5 is a diagram that illustrates an exemplary scenario for generating the flashcards, according to an exemplary embodiment of the present invention.

FIG. 5 is a diagram that illustrates an exemplary scenario for generating the flashcards, according to an exemplary embodiment of the present invention. FIG. 5 shows a possible layout 500 for the card generator system implemented by means of the application server 102*a* or the processor 108. The various operations in this exemplary scenario will be facilitated and executed by the application server 102*a* or the processor 108 and will be performed and initiated by the user. For example, as shown, at 502, a user can drag-and-drop a sentence from the uploaded document to the definition area to generate a flashcard with the definition and the sentence. At 504, the user can click on a word from the pre-selected list to see definitions and sentences for this word. At 506, the user can enter a word in some input field to see definitions and sentences for this word. At 508, the user can choose a source dictionary (for definitions) from the drop-down/list. The user can also choose sentences for the flashcard using checkboxes 510 and generate the flashcard by clicking on an icon 512 associated with the definition. The user can also generate the flashcard by clicking on an icon 514 associated with the example sentence for the definition (in this case the flashcard will contain this example sentence and definition).

A person having ordinary skills in the art would understand that the term "sentence from a book" may also mean a sentence from a movie/TV show script or any other document uploaded by the user.

In conjunction with FIGS. 1 and 5, the card generator (facilitated and implemented by the application server 102*a* or the processor 108) functions as a part of the system, where the user can keep track of words that the user is learning or is going to learn. The system also provides a possibility for the user to see dictionary articles for the words (as shown in FIG. 5), either using APIs or offline contents of the existing dictionaries. Optionally, the application server 102*a* provides a possibility for the user to upload documents (books, movie scripts, or the like, which will be stored in the database server 102*b* or the memory 110) in different formats or use documents pre-uploaded by the system operators (that are stored in the database server 102*b* or the memory 110) and use their contents as a source of usage examples of the words (as shown in FIG. 5). The documents may include, but are not limited to, the books, audio, video, or movies that the user read/watched or is going to read/watch. The users may have a list of words/families to learn and when they click on a word (or type a word), the users see a dictionary article for the word and sentences with the word from the uploaded documents (list of words and sentences can be obtained from the database and dictionary can be chosen from the predefined list using a dropdown or other UI element) (as shown in FIG. 5).

The user goes through the article from one or several dictionaries, learns the meaning of a word (family), and chooses a meaningful definition. Then, as shown in FIG. 5, the user matches a chosen definition with a sentence from a book by drag-and-dropping the sentence from the book to the definition area (or associated UI element) and the application server 102*a* generates the flashcard with preconfigured tags, layout (for front and back of the flashcard), and elements including the definition and the sentence. Other elements can be a word, part of speech, transcription, audio with the word pronunciation, representative picture, example sentences (from books or movies or dictionary itself, or audio, if it is available from the dictionary, audiobook, movie or generated by computer), chosen definition, entire dictionary article, word origin, word frequency information or other dictionary article elements, reference to a book/movie (for the book sentence), etc. The user can make additional changes to the flashcard if necessary and save the flashcard and/or export it to some third-party space repetition/card review system. Alternatively, to drag-and-drop operation, the user can just click on/touch UI element/area associated with the example sentence from the dictionary definition and produce a similar flashcard with the book sentence being replaced by the dictionary sentence. Alternatively, to drag-and-drop operation, the user can do any other operations to select sentences for the generated flashcard and associate them with a dictionary definition for a word (e.g., clicking special checkboxes associated with the sentences and some UI element associated with the definition). For each word or definition, the user can generate more than one flashcard.

In an alternative embodiment, the card generator may be integrated into a book or document e-reader (which also might be optionally a part of the broader system). The user clicks on/touches (in the case of a touchscreen) a word in a sentence while reading and sees a dictionary article enhanced with the card generation elements. The user can click/touch the card generation UI widget associated with a particular definition or definition's example sentence and the application server 102*a* (i.e., the card generator) will generate a flashcard for the word (optionally using the current book sentence as the card element. This can be determined by a particular widget in the dictionary article user interacts with). The flashcard is further saved or exported into an internal or third-party card review system. The users can choose from dictionaries, the pre-configured layouts of the cards, and do all other steps described above in association with FIGS. 1 and 5.

Although the present invention has been described with respect to various schematic representations (FIGS. 1-5), it should be understood that the proposed book recommendation and flashcard generation methods and systems can be realized and implemented by using the various computing machine(s) and server(s), and thus the present invention here should not be considered limited to the exemplary embodiments and processes described herein. Although particular embodiments of the invention have been described in detail for purposes of illustration, various modifications and enhancements may be made without departing from the spirit and scope of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

Various embodiments of the disclosure provide a non-transitory computer readable medium having stored thereon, computer executable instructions, which when executed by a computer, cause the computer to execute operations for recommending reading materials based on a vocabulary of a user. The operations include creating a list of a plurality of word families for a plurality of users. The operations further include collecting and tracking each user list of familiar word families. The operations further include facilitating the user to navigate over a plurality of books and book collections, indicating for the books and book collections, a current share of familiar running words and a number of word families to be learned to reach various familiarity levels. The books or book collections are provided by either the user or one or more system operators. The operations further include displaying a plurality of unfamiliar word families in a selected book or a book collection with a number of times those word families are used in the selected book or book collection. Further, the user selects the word families which the user wants to learn from the selected book or book collection, and a combined share is displayed in the book or book collection of familiar running words and running words belonging to the selected word families.

What is claimed is:

1. A system for recommending reading materials based on a vocabulary of a user, the system comprising:
a computing device, one or more processors, and a memory,
wherein the memory is coupled to the one or more processors to store instructions executable by the one or more processors,
wherein the one or more processors are configured to:
create a list of a plurality of word families for a plurality of users;
collect and track each user list of familiar word families;
facilitate the user to navigate through a user interface of the computing device over a plurality of books and book collections, indicating for the books and book collections, a current share of familiar running words and a number of word families to be learned to reach various familiarity levels, wherein the books or book collections are provided by either the user or one or more system operators; and
display through a user interface of the computing device a plurality of unfamiliar word families in a selected book or book collection with a number of times those word families are used in the selected book or book collection,
wherein the user selects the word families which the user wants to learn from the selected book or book collection, and wherein the one or more processors are further configured to display a combined share in the book or book collection of familiar running words and running words belonging to the selected word families.

2. The system of claim 1, which allows the user to add and remove the books and book collections to a user reading backlog and displays the plurality of unfamiliar word families in the selected book or book collection with the number of times those word families are used in the selected book or book collection and the number of times those word families are used in books of the user reading backlog.

3. The system of claim 2, which allows the user to set a target familiarity level for the books or book collections in the backlog and displays a projected share of familiar running words and a projected number of word families the user needs to learn to reach the set target familiarity level for each book or collection in the user's reading backlog incrementally under an assumption that the user will learn all the word families recommended for preceding books in the backlog.

4. The system of claim 3, which has a mode to display to the user a projected share of familiar running words and a projected number of word families the user needs to learn to reach various familiarity levels for a book or a book collection under an assumption that the user will learn all the word families recommended for the books of a current reading backlog at their set target familiarity levels.

5. The system of claim 1, which visualizes for the books or book collections a metric of normalized numbers of word families to be learned to reach various familiarity levels.

6. The system of claim 5, wherein normalization is done to a size of a book.

7. The system of claim 5, wherein the various familiarity levels are color-coded depending on a corresponding numerical value of the metric.

8. The system of claim 5, wherein the metric can be normalized on any number of pages, number of running words or other derived characteristics.

9. The system of claim 8, wherein the metric can be replaced by any other metric in linear, near-linear, direct proportional or inverse proportional relationship with the described one, and wherein the metric is used on individual books, series, or arbitrary collections of books.

10. The system of claim 1, wherein the familiarity levels of the books is in a range from 95% and higher.

11. The system of claim 1, wherein the user provides the books and book collections in a plurality of formats that includes at least EPUB or MOBI.

12. The system of claim 1, wherein the one or more processors are further configured to track the word families that the user chose to learn and show an order of their first usage in the book or book collection so that the user can pre-learn them in that order and start reading before learning all the chosen words families used in the book or book collection.

13. The system of claim 1, wherein the one or more processors are further configured to track the word families that the user selected to learn and where the user can select a word family and see usage examples of the words of this family in user-provided books.

14. The system of claim 1, wherein the one or more processors are further configured to track the word families that the user selected to learn and provides to the user modified versions of the books with the words of the selected word families highlighted or marked.

15. The system of claim 1, wherein the one or more processors are further configured to:
provide words or families of words to the user, wherein the user uses the words or families of words to learn;
provide one or more dictionaries, wherein the user accesses content of the one or more dictionaries through an extended interface; and
provide uploaded documents, wherein the user, for each word or family, accesses a list of usage examples from the uploaded documents.

16. The system of claim 15, wherein the user chooses a word and a dictionary and sees definitions for the word and usage examples from the dictionary and the uploaded documents.

17. The system of claim 15, wherein the one or more processors are further configured to provide a user interface that can be used by the user to configure a personal layout for generating a flashcard.

18. The system of claim 17, wherein the user chooses a definition and one or more examples for generating the flashcard with the chosen definition and examples.

19. The system of claim 1, wherein the one or more processors are further configured to create and facilitate a learning trajectory which allows the user to choose how aggressively the user would like to proceed with learning new words.

20. A method for recommending reading materials based on a vocabulary of a user, the method comprising:
creating a list of a plurality of word families for a plurality of users;
collecting and tracking each user list of familiar word families;
facilitating the user to navigate over a plurality of books and book collections, indicating for the books and book collections, a current share of familiar running words and a number of word families to be learned to reach various familiarity levels, wherein the books or book collections are provided by either the user or one or more system operators; and
displaying a plurality of unfamiliar word families in a selected book or a book collection with a number of times those word families are used in the selected book or book collection,
wherein the user selects the word families which the user wants to learn from the selected book or book collection, and wherein a combined share is displayed in the book or book collection of familiar running words and running words belonging to the selected word families.

21. A non-transitory computer-readable medium having stored thereon computer-executable instructions, which when executed by a system for recommending reading materials based on a vocabulary of a user, cause the system to execute operations, the operations comprising:
creating a list of a plurality of word families for a plurality of users;
collecting and tracking each user list of familiar word families;
facilitating the user to navigate over a plurality of books and book collections, indicating for the books and book collections, a current share of familiar running words and a number of word families to be learned to reach various familiarity levels, wherein the books or book collections are provided by either the user or one or more system operators; and
displaying a plurality of unfamiliar word families in a selected book or a book collection with a number of times those word families are used in the selected book or book collection,
wherein the user selects the word families which the user wants to learn from the selected book or book collection, and wherein a combined share is displayed in the book or book collection of familiar running words and running words belonging to the selected word families.

* * * * *